(12) United States Patent
Chiu (10) Patent No.: US 8,107,640 B2
(45) Date of Patent: Jan. 31, 2012

(54) CAR-USE EXTENDED DEVICE AND SETTING METHOD FOR OPERATION INTERFACE OF CAR-USE CONTROL SYSTEM

(75) Inventor: Feng-Ching Chiu, Taoyuan (TW)

(73) Assignee: Feng-Ching Chiu, Taoyuan (TW)

( * ) Notice: Subject to any disclaimer, the term of this patent is extended or adjusted under 35 U.S.C. 154(b) by 1057 days.

(21) Appl. No.: 11/972,201

(22) Filed: Jan. 10, 2008

(65) Prior Publication Data

US 2008/0306618 A1    Dec. 11, 2008

(30) Foreign Application Priority Data

Jun. 8, 2007   (TW) ............................... 96120907 A (51) Int. Cl.
*H04B 3/00* (2006.01)
(52) U.S. Cl. ............ 381/77; 381/85; 381/123; 381/314; 381/323
(58) Field of Classification Search .................... 381/77, 381/85, 123, 314, 323
See application file for complete search history.

(56) References Cited

U.S. PATENT DOCUMENTS

| 5,155,770 | A  | * | 10/1992 | Maejima .......................... 381/18 |
| 6,788,983 | B2 | * | 9/2004  | Zheng ............................. 700/94 |
| 7,065,222 | B2 | * | 6/2006  | Wilcock ......................... 381/310 |
| 7,266,207 | B2 | * | 9/2007  | Wilcock et al. ............... 381/310 |

* cited by examiner

*Primary Examiner* — Andy Huynh
(74) *Attorney, Agent, or Firm* — Rosenberg, Klein & Lee (57) ABSTRACT

A car-use extended device is applied to electrically communicate to a car-use audio device to form a car-use control system, so as to simulate a user-to-machine operation interface for controlling an electronic computing device installed with an operation system to execute at least one preset assignment. The car-use audio device comprises an operation interface comprising a trigger element and at least one working signal input element. The extended device comprises a micro control unit comprising an interface-function setting program. When the trigger element is triggered, a triggering signal is generated and sent to the micro control unit, and the interface-function setting program is provided to define the preset assignment that the working signal input element represents. Hereafter, when the working signal input element is triggered, the micro control unit outputs a working signal to the electronic computing device, so as to make the electronic computing device execute the preset assignment.

25 Claims, 7 Drawing Sheets

CAR-USE EXTENDED DEVICE AND SETTING METHOD FOR OPERATION INTERFACE OF CAR-USE CONTROL SYSTEM

FIELD OF THE INVENTION

The present invention relates to a car-use extended device, and more particularly to a car-use extended device being applied to electrically communicate to a car-use audio device, so as to form a car-use control system to simulate a user-to-machine operation interface for controlling an electronic computing device installed with an operation system to execute at least one preset assignment.

BACKGROUND OF THE INVENTION

In general, a car is usually provided with at least one car-use audio device to execute the functions of receiving audio programs and playing multimedia. Going with the trend, the electronic device has already become an indispensable tool in daily life. Especially, when driving a car, for the purposes of getting instant traffic information, enjoying multimedia, and downloading data through internet, etc., people always take an electronic computing device installed with an operation system along. More often, the electronic computing device can be a personal computer (PC), a notebook (NB), a personal digital assistant (PDA), a mobile phone, a video game machine. It is certain that the electronic computing device installed with the operation system also can be an embedded computer, which is embedded into the car.

However, among the prior arts, the car-use audio device and the electronic computing device are usually provided individually. Therefore, it is necessary to control the car-use audio device and the electronic computing device via two individual operation interfaces respectively. Following up, the detail technology of the prior art will be disclosed with drawings.

Figure 1:
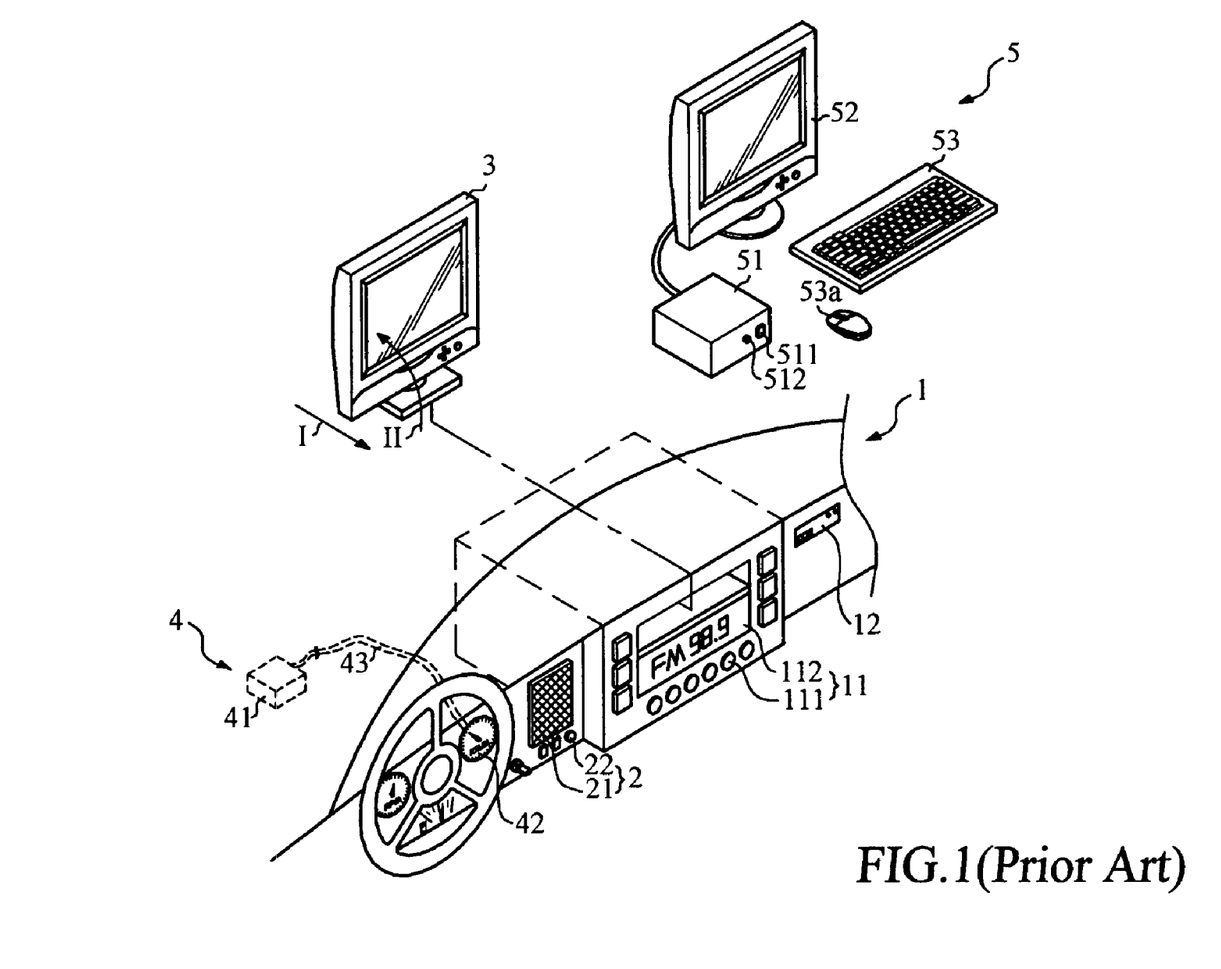
FIG. 1 illustrates that in the prior art, the personal computer is controlled through a keyboard or a mouse within a car.

Please refer to FIG. 1, which illustrates that the personal computer is controlled through a keyboard or a mouse within a car. As shown in FIG. 1, a car assembled with a car-use audio device 1, a sound playing unit 2, a main display 3 and speed monitoring module 4. The car-use audio device 1 comprises an operation interface 11 and a multimedia reading unit 12. The operation interface 11 has a plurality of function keys 111 and an operation display 112. The multimedia reading unit 12 usually can be a CD, VCD, DVD or MD reader. The sound playing unit 2 comprises a sound player 21 and a sound output terminal 22. The sound player 21 usually can be a car-use speaker, and the sound output terminal 22 is usually applied to communicate with an earphone or other sound playing members.

The main display 3 can be located within a receiving groove within the car-use audio device 1. The speed monitoring module 4 is applied to monitoring a moving speed of the car, and comprises a speed monitoring member 41, a speedometer 42 and a speed monitoring wire 43. The speed monitoring wire 43 is connected to the speed monitoring member 41 and the speedometer 42. Besides, an electronic computing device installed with an operation system is put in the car for a user to use, wherein the electronic computing device can be a PC, an NB, a PDA, a mobile phone, a video game machine, or an embedded computer being embedded in the car.

In FIG. 1, the electronic computing device is a PC 5, which comprises a PC host 51, a display 52 and two user-to-machine operation interface. The PC host 51 has a power on/off button 511 and a reset button 512, and the two user-to-machine operation interface are a keyboard 53 and a mouse 53a.

In general, when the car is triggered to start, the car-use audio device 1 simultaneously enter a standby condition. In this moment, a user can operate one of the function keys 111 to make the main display 3 be extracted out along an extraction direction I, and rotated along a rotation direction II to an angle suitable for the user to watch. Following up, the user can operate the one or more of the function keys 111 to make the car-use audio device 1 to execute the preset assignments of playing audio programs, or playing multimedia read by the multimedia reading unit 12.

Moreover, when the user intend to using the PC 5, it is necessary to press the power on/off button 511 to boot the PC 5, and then input at least one working signal, via the keyboard 53 or the mouse 53a, to make the PC 5 execute at least one preset assignment. When the PC 5 is crashed, it is necessary to press the reset button 512 to reboot the PC 5.

People skilled in ordinary arts can easily realize that, in above prior arts, it is necessary to operate the operation interface 11 and the user-to-machine operation interface, i.e., the keyboard 53 or the mouse 53a, when the user need to control both the car-use audio device 1 and the PC 5. Meanwhile, when the user intend to use many different electronic computing devices, it is further necessary to operate different user-to-machine operation interface to control the electronic computing devices, and then brings more inconvenience.

Besides, when the PC 5 combines with a global positioning system (GPS), it is usually necessary to catch a speed data to execute the function of guided-driving. In the existed methods, the speed data is usually calculated from the relation of the coordinate data and the moving time. In practice, the movement distance calculate from the coordinate data is usually much different from the real movement distance that the car actually move, especially when it is under a bad signal receiving condition.

SUMMARY OF THE INVENTION

Due to that in the prior arts, there are many inconvenience problems in operation, the primary object of the present invention provides a car-use extended device to solve the problems. The car-use extended device is applied to electrically communicate to a car-use audio device, so as to form a car-use control system. The car-use control system is applied to simulate a user-to-machine operation interface, such as a simulate keyboard, a simulate mouse, a simulate remote control, a simulate control bar, etc., so as to further control the electronic computing device to execute at least one preset assignment.

The second object of the present invention provides a method for setting an operation interface of the car-use control system, so as to set the functions of the operation interface for controlling at least one electronic computing device.

Another object of the present invention provides a car-use extended device electrically communicated to an car-use audio device, so as to form a car-use control system. The car-use control system is electrically connected to an electronic computing device and a speed monitoring module, and transfers a moving speed of the car to a speed data, which is acceptable for the electronic computing device.

Means of the present invention for solving the problems as mentioned above provides a car-use extended device. The car-use extended device is applied to electrically communicate to a car-use audio device to form a car-use control system, so as to simulate a user-to-machine operation interface for controlling an electronic computing device installed with an operation system to execute at least one preset assignment. The car-use audio device comprises an operation interface comprising a trigger element and at least one working signal input element. The extended device comprises a micro control unit comprising an interface-function setting program.

When the trigger element is triggered, a triggering signal is generated and sent to the micro control unit, and the interface-function setting program is provided to define the preset assignment that the working signal input element represents. Hereafter, when the working signal input element is triggered, the micro control unit outputs a working signal to the electronic computing device, so as to make the electronic computing device execute the preset assignment.

When the trigger element is triggered under a mode for controlling the electronic computing device, a user can set at least one function of at least one working signal input element for actually controlling many different electronic computing devices. Furthermore, in the preferred embodiments, the car-use extended device is further electrically connected to an electronic computing device and a speed monitoring module, so as to transmit a speed data, i.e., the moving speed of the car that actually monitored by the speed monitoring module, to the electronic computing device.

From above description, comparing with the technology as disclosed in prior arts, the car-use extended device of the present invention can be electrically communicated to a car-use audio device to form a car-use control system, which can be applied to simulate at least one user-to-machine operation interface, such as a simulate mouse, a simulate keyboard, a simulate remote control, a simulate control bar, etc. Therefore, it is only necessary to use the operation interface of the car-use control system to control the car-use audio device and the electronic computing device. Nevertheless, due to that the user can set the functions of the working signal input elements to control different electronic computing devices, it also can effectively increase the convenience in operation to further solve the problems in prior arts.

Additionally, in the present invention, the car-use extended device of the car-use control system is electrically communicated to the electronic computing and the speed monitoring module, so that a speed data, i.e., the moving speed of the car that actually monitored by the speed monitoring module, can be transmitted to the electronic device to get a more correct speed data.

The devices, characteristics, and the preferred embodiment of this invention are described with relative figures as follows.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The car-use extended device as provided in accordance with the present invention can be electrically communicated to a car-use extended device to form a car-use control system, and the car-use extended device and the method for setting the operation interface can be applied to many kinds of car, so that the user cab control the car-use audio device and many electronic computing device via a single operation interface. Moreover, the combined applications are too numerous to be enumerated and described, so that only three preferred embodiments are disclosed as follows for representation.

Figure 2:
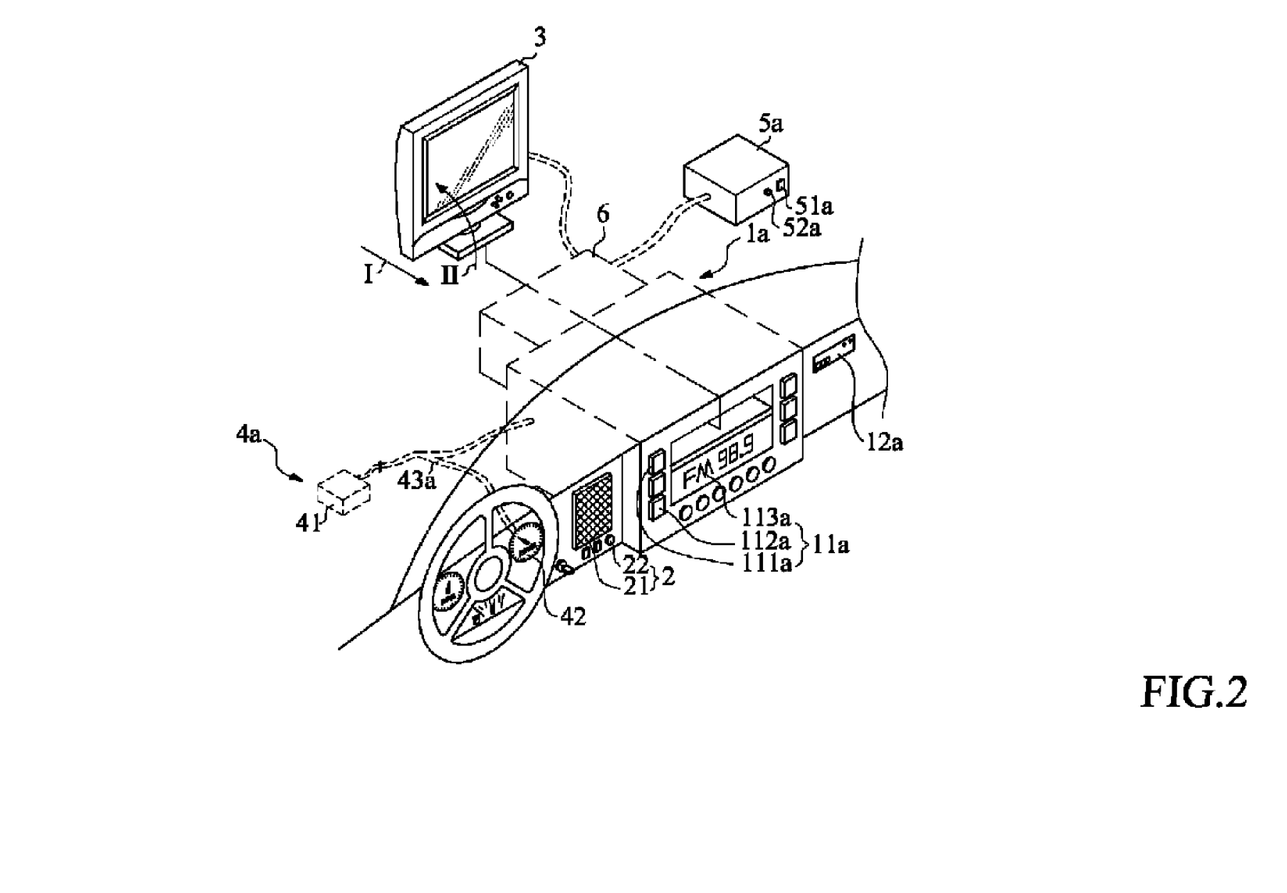
FIG. 2 is a perspective view illustrating a first embodiment in accordance with the present invention.
Figure 3:
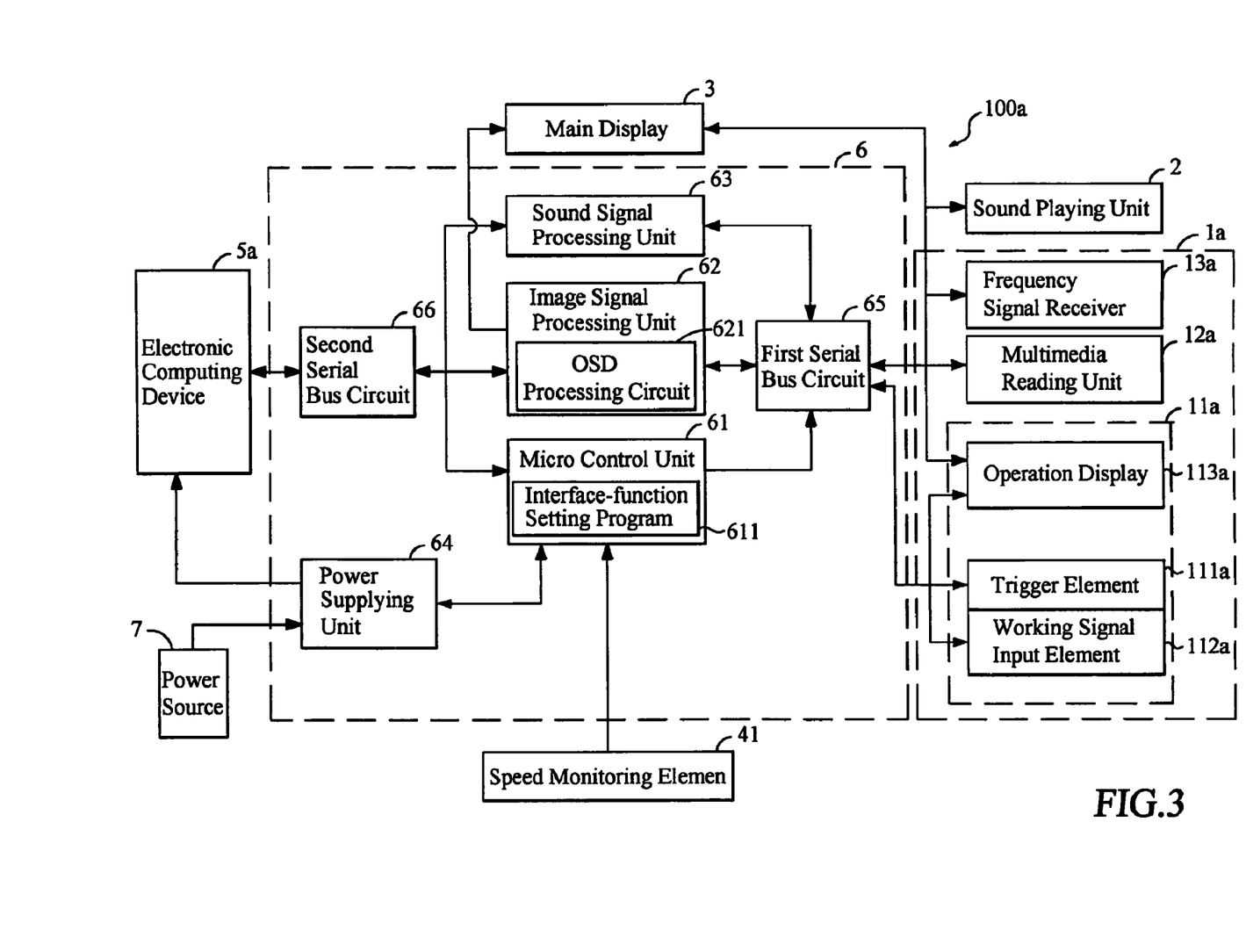
FIG. 3 is a system functional block of the first embodiment of the present invention.

Please refer to FIG. 2 and FIG. 3. FIG. 2 is a perspective view illustrating a first embodiment in accordance with the present invention, and FIG. 3 is a system functional block of the first embodiment of the present invention. As shown in the figures, a car is assembled with a car-use audio device 1a, a car-use extended device 6, and also assembled with the sound playing unit 2 and the main display 3 as mentioned above, wherein the car-use extended device 6 is electrically communicated to the car-use audio device 1a to form a car-use control system 100.

The car-use audio device 1a comprises an operation interface 11a, a multimedia reading unit 12a and a audio frequency signal receiver 13a. The operation interface 11a has a trigger element 111a, a plurality of working signal input elements 112a and an operation display, so as to simulate a user-to-machine operation interface to control an electronic computing device installed with an operation system. In actual applications, the trigger element usually can be a mode-switching button, working signal input elements 112a usually can be a plurality of function keys, and the operation display can be a touch screen. The multimedia reading unit can be a tape, CD, VCD, DVD, or MD reader.

The sound playing unit 2 is electrically communicated to the multimedia reading unit 12a and the audio frequency signal receiver 13a, and comprises the sound player 21 and the sound output terminal 22 as mentioned. The sound player 21 usually can be a car-use speaker, and the sound output terminal 22 is usually applied to communicate with an earphone or other sound playing members. The main display 3 is located within a receiving groove within the car-use audio device 1, and respectively communicated to the multimedia reading unit 12a and the audio frequency signal receiver 13a. The speed monitoring module 4a comprises the speed monitoring element 41 and the speedometer 42 as mentioned, and further comprises a speed monitoring wire 43a. The speed monitoring wire 43a is respectively connected to the speed monitoring element 41, the speedometer 42 and the micro control unit 14.

The electronic computing device 5a comprises a power on/off button 51a and a reset button 52a. In actual applications, the electronic computing device 5a can be a PC, an NB, a PDA, a mobile phone, a video game machine, or an embedded computer being embedded in the car. The difference between the electronic computing device 5a and the PC 5 is that the electronic computing 5a just needs to have a host, and it is neither necessary to connect to any other display nor to any other user-to-machine operation interface.

The car-use extended device 6 comprises a micro control unit 61, an image signal processing unit 62, a sound signal processing unit 63, a power supplying unit 64, a first serial bus circuit 65 and a second serial bus circuit 66. The micro control unit 61 is electrically communicated to the operation interface 11a and the speed monitoring element 41, and comprises an interface-function Setting Program 611 preset with an initial control code. The image signal processing unit 62 is electrically communicated to the micro control unit 61 and the main display 3, and comprises an on-screen display (OSD) processing circuit 621. The sound signal processing unit 63 is electrically communicated to the micro control unit 61. The power supplying unit 64 is electrically communicated to the micro control unit 61 and the electronic computing device 5a, and usually can be a power supply.

The first serial bus circuit 65 is electrically communicated to the operation interface 11a, the multimedia reading device 12a, the audio frequency signal receiver 13a, the sound playing unit 2, the micro control unit 61, the image signal processing unit 62 and the sound signal processing unit 63. The second serial bus circuit 66 is electrically communicated to the electronic computing device 5a, the micro control unit 61, the image signal processing unit 62 and the sound signal processing unit 63. A power source 7 is electrically connected to the power supplying unit 64. Meanwhile, the second serial bus circuit 66 can be a universal serial bus (USB) circuit, a wireless USB circuit, a composite bus circuit, a compound bus circuit, or a PS2 circuit.

In general, when the car is triggered to start, the micro control unit 61 can transmit a power supplying signal to the power supplying unit 64 to make the power supplying unit 64 supply a specified electricity to the electronic computing device 5a, and then the car-use audio device 1a enter to a standby condition. In this moment, the user can operate one of the working signal input elements 112a to make the main display be extracted out along the extraction direction I, and rotated along the rotation direction II to an angle suitable for the user to watch.

In the first embodiment, the user can operate the trigger element 111a to switch to three operation modes, wherein the first operation mode is to receive audio frequency signal, the second operation mode is to play multimedia, and the third operation mode is to control at least one electronic computing device.

When switching to the first mode, the audio frequency receiver 13a can receive the audio frequency signal from the external environment. If the audio frequency signal is composed of both a sound signal and an image signal, the audio frequency signal will be transmitted to the car-use audio device 1a, processed by the car-use audio device 1a, played by the sound playing unit 2 and displayed by the main display 3. In this moment, the working signal input elements 112a are defined as the function keys of adjusting the frequency or the amplitude, so as to execute the preset assignments of adjusting the frequency or the amplitude.

When switching to the second mode, the multimedia reading unit 12a can read the multimedia data stored in the tape, CD, VCD, DVD or MD. If the multimedia data is composed of both a sound data and an image data, the multimedia data will be transmitted to the car-use audio device 1a, processed by the car-use audio device 1a, played by the sound playing unit 2, and displayed by the main display 3. In this moment, the working signal input elements 112a are defined as the function keys for controlling the output of the multimedia, so as to execute the preset assignments of adjusting color, brightness, volume, replaying, fast forward playing, or fast backward playing, etc.

When switching to the third mode, the user can press the trigger element 111a to generate a triggering signal, which can be transmitted to the micro control unit 61 of the car-use extended device 6. In this moment, the interface-function setting program 611 can call an initial control code preset therein. The initial control code defines the relation between the working signal input elements 112a and the user-to-machine operation interface of the electronic computing device 5a.

In the initial control code, if one of the working signal input elements 112a is defined as an "Enter" key of a keyboard, a working signal will be transmitted through the micro control unit 61 and the second serial bus 66 to the electronic computing device 5a when the user operates said one of the working signal input elements 112a, so as to control the electronic computing device 5a to execute an preset assignment of "Enter". From above description, it is undoubtedly the working signal input elements 112a really can be served to simulate the user-to-machine operation interface, so as to control the electronic computing device to execute the preset assignments.

If the preset assignment is playing the multimedia data provided by the electronic computing device 5a, and the multimedia data is composed of both an image data and a sound data, the multimedia data will be respectively transmitted through the second serial bus circuit 66 to the image signal processing unit 62 and the sound signal processing unit 63, respectively processed by the mage signal processing unit 62 and the sound signal processing unit 63, played by the sound playing unit 2, and displayed by the main display 3.

If the preset assignment is transmitting the multimedia data read from the multimedia reading unit 12a to the electronic computing device 5a, the multimedia data can read from the multimedia reading unit 12a can be transmitted through the second serial bus circuit 66 to the electronic computing device 5a. Similarly, If the preset assignment is saving the multimedia data read from the multimedia reading unit 12a into the electronic computing device 5a, the multimedia data can be transmitted through the second serial bus circuit 66 to the electronic computing device 5a.

Moreover, one of the working signal input element 112a can be defined as the power on/off button 51a; therefore, said one of the working signal input elements 112a can be applied to control whether supplying the specified electricity to the electronic computing device 5a. Similarly, another one of the working signal input elements 112a also can be defined as the reset button 52; thus, said one of the working signal input elements 112a can be applied to reset the electronic computing device 5a.

Nevertheless, the speed monitoring element 41 can monitor a moving speed of the car, and transfer the moving speed to a speed data. The speed data can be transferred to the micro control unit 61, which can analyze the speed data, and transmit the speed data to the electronic computing device 5a; therefore, the speed data, that the electronic computing device receives, is very approximate to the real speed that the car actually moves.

Figure 4:
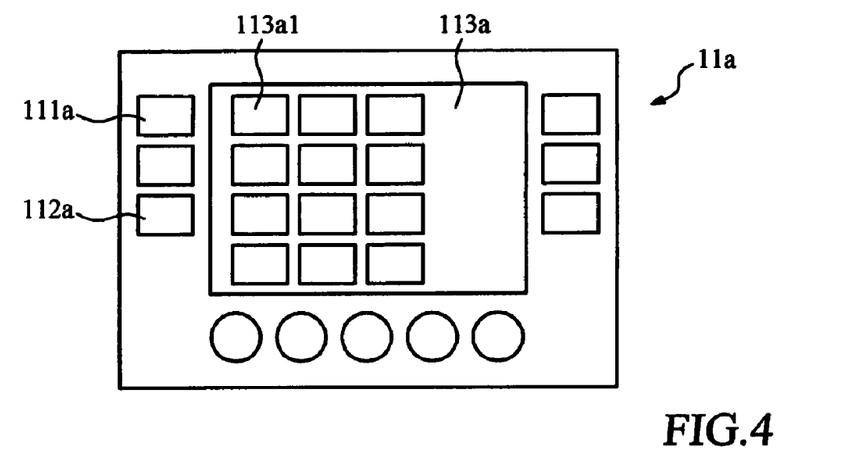
FIG. 4 illustrates that the operation interface can display operation icons in the first embodiment of the present invention.

For further disclosing the present invention, three application of the operation icons, the simulate keyboard and the simulate mouse are provided with the figures as presented as follows. Please refer to FIG. 3 and FIG. 4, wherein FIG. 4 illustrates that the operation interface can display operation icons in the first embodiment of the present invention. As shown in the figures, due to that the image signal processing unit 62 comprises the OSD processing unit 621, in the third operation mode, the image signal processing unit 62 can output a plurality of operation icons 113a1 displaying on the operation screen 113a. Each of the operation icons 113a1 represents one or more preset assignment that the user-to-machine operation interface can control the electronic computing device 5a to execute. Thus, the user can operates the working signal input elements 112a to select any one of the operation icons 113a1, so as to control the electronic computing device 5a execute the preset assignment.

When the operation display 113a is a touch screen, the user can use his finger to directly touch any of the operation icons 113a1 to control the electronic computing device 5a to execute any present assignment that any of the operation icons 113a1 represents. In this condition, the operation icons 113a1 displayed on the operation display 113a also can be viewed as another kind of working signal input elements.

Figure 5:
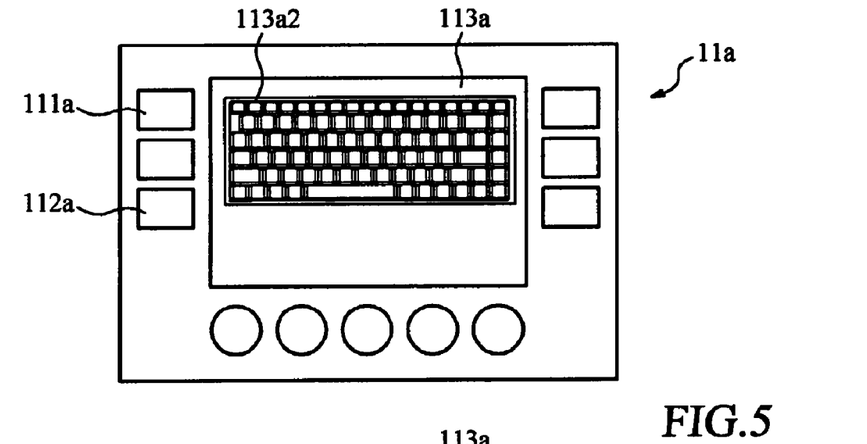
FIG. 5 illustrates that the operation interface can display a simulate keyboard in the first embodiment of the present invention.

Please refer to FIG. 3 and FIG. 5, wherein FIG. 5 illustrates that the operation interface can display simulate keyboard in the first embodiment of the present invention. As shown in the figures, due to that the image signal processing unit 62 comprises the OSD processing unit 621, in the third operation mode, the image signal processing unit 62 can output a simulate keyboard 113a2 with a plurality of simulate function keys displaying on the operation screen 113a. Each of the function keys of the simulate keyboard 113a2 represents one or more preset assignment that the user-to-machine operation interface can control the electronic computing device 5a to execute. Thus, the user can operates the working signal input elements 112a to select any one of the function key of the simulate keyboard 113a2, so as to control the electronic computing device 5a execute the preset assignment.

When the operation display 113a is a touch screen, the user can use his finger to directly touch any of the function keys of the simulate keyboard 113a2 to control the electronic computing device 5a to execute any present assignment that any of the function keys of the simulate keyboard 113a2 represents. In this condition, the simulate keyboard 113a2 displayed on the operation display 113a also can be viewed as another kind of working signal input elements.

Figure 6:
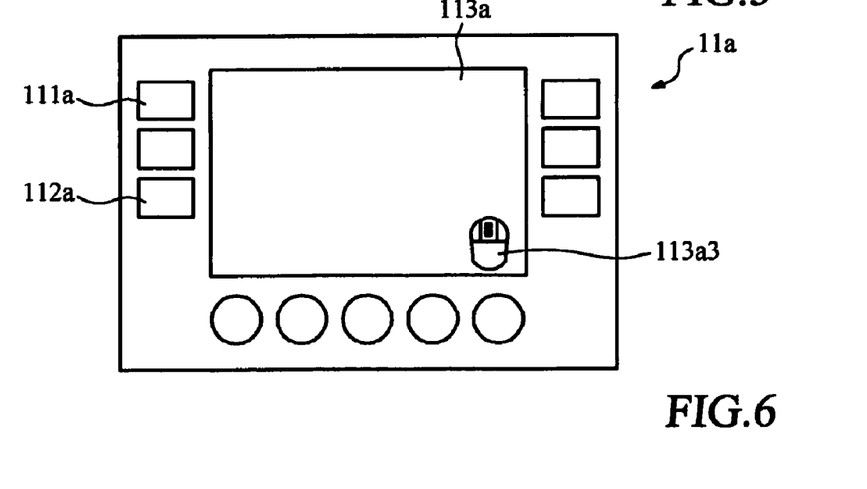
FIG. 6 illustrates that the operation interface can display a simulate mouse in the first embodiment of the present invention.

Please refer to FIG. 3 and FIG. 6, wherein FIG. 6 illustrates that the operation interface can display simulate mouse in the first embodiment of the present invention. As shown in the figures, due to that the image signal processing unit 62 comprises the OSD processing unit 621, in the third operation mode, the image signal processing unit 62 can output a simulate mouse 113a3 with a simulate left key, a simulate right key and a simulate roller displaying on the operation screen 113a. The simulate left key, the simulate right key or the simulate roller of the simulate mouse 113a3 represents one or more preset assignment that the left key, the right key and the roller of a mouse can control the electronic computing device 5a to execute. Thus, the user can operates the working signal input elements 112a to select the simulate left key, the simulate right key or the simulate roller of the simulate mouse 113a3, so as to control the electronic computing device 5a execute the preset assignment.

When the operation display 113a is a touch screen, the user can use his finger to directly touch simulate left key, the simulate right key or the simulate roller of the simulate mouse 113a3 to control the electronic computing device 5a to execute any present assignment that simulate left key, the simulate right key or the simulate roller of the simulate mouse 113a3 represents. In this condition, the simulate mouse 1 13a3 displayed on the operation display 113a also can be viewed as another kind of working signal input elements.

People skilled in ordinary art can easily realize that, in the first embodiment of the present invention, the second serial bus circuit 66 is directly electrically connected to the electronic computing device 5a. However, in actual applications, it is also able to transmit any signal between the second serial bus circuit 66 and the electronic computing device 5a in a wireless way if but not only if the second serial bus circuit 66 is a wireless USB circuit.

Figure 7:
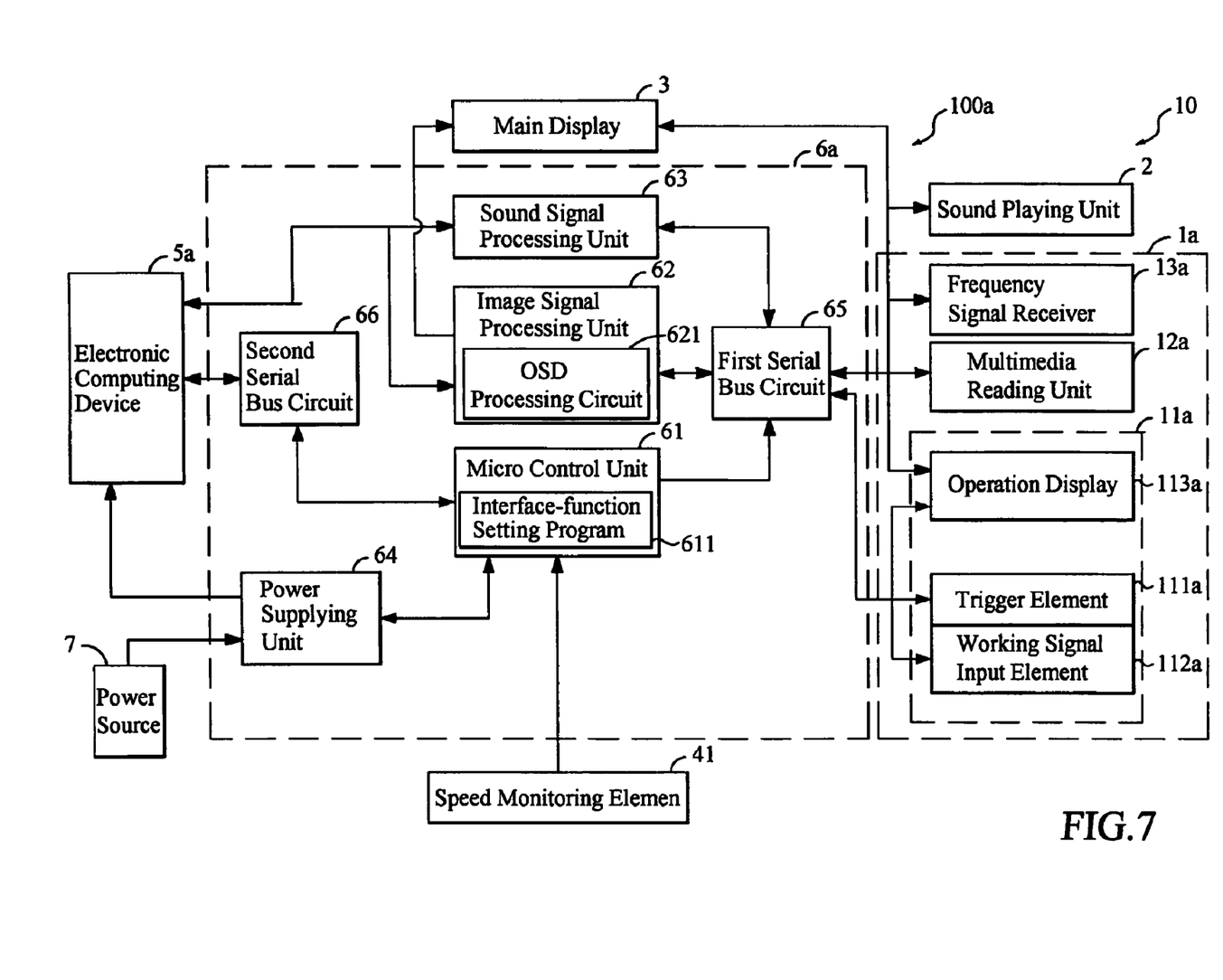
FIG. 7 is a system functional block of a second embodiment of the present invention.

Next, a second embodiment of the present invention will be further disclosed. Please refer to FIG. 3 and FIG. 7, wherein FIG. 7 is a system functional block of a second embodiment of the present invention. As shown in the figures, in the second embodiment of the present invention, another car-use extended device 6a is applied to replace the car-use extended device 6, so as to from another car-use control system 100a. The difference between the car-use extended device 6a and 6 is that in the car-use extended device 6a, the image processing unit 62 and the sound processing unit 63 are electrically communicated to the electronic computing device 5a directly without directly communicating to the second serial bus circuit 66. In other words, the image processing unit 62 and the sound processing unit 63 can directly transmit signals to the electronic computing device 5a, or receive signals transmitted from the electronic computing device 5a.

Figure 8:
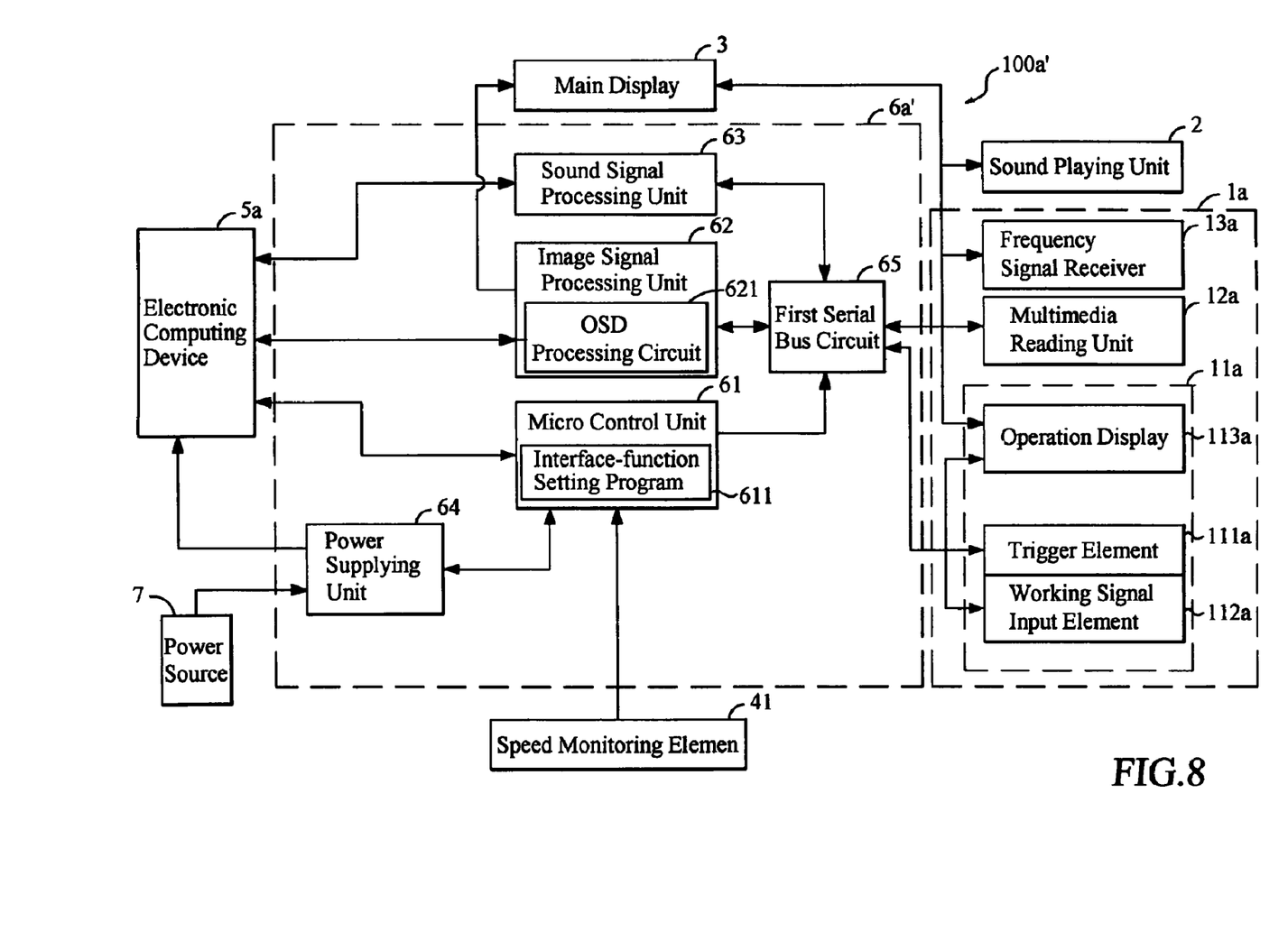
FIG. 8 is a system functional block of a third embodiment of the present invention.

Following up, a third embodiment of the present invention will be further disclosed. Please refer to FIG. 3 and FIG. 8, wherein FIG. 8 is a system functional block of a third embodiment of the present invention. As shown in the figures, in the third embodiment of the present invention, another car-use extended device 6a' is applied to replace the car-use extended device 6, so as to from another car-use control system 100a'. The difference between the car-use extended device 6a' and 6 is that there is no second serial bus circuit 66 in the car-use extended device 6a'. Thus, the micro control unit 61, the image processing unit 62 and the sound processing unit 63 are electrically communicated to the electronic computing device 5a directly. In other words, the micro control unit 61, the image processing unit 62 and the sound processing unit 63 can directly transmit signals to the electronic computing device 5a, or receive signals transmitted from the electronic computing device 5a.

Figure 9:
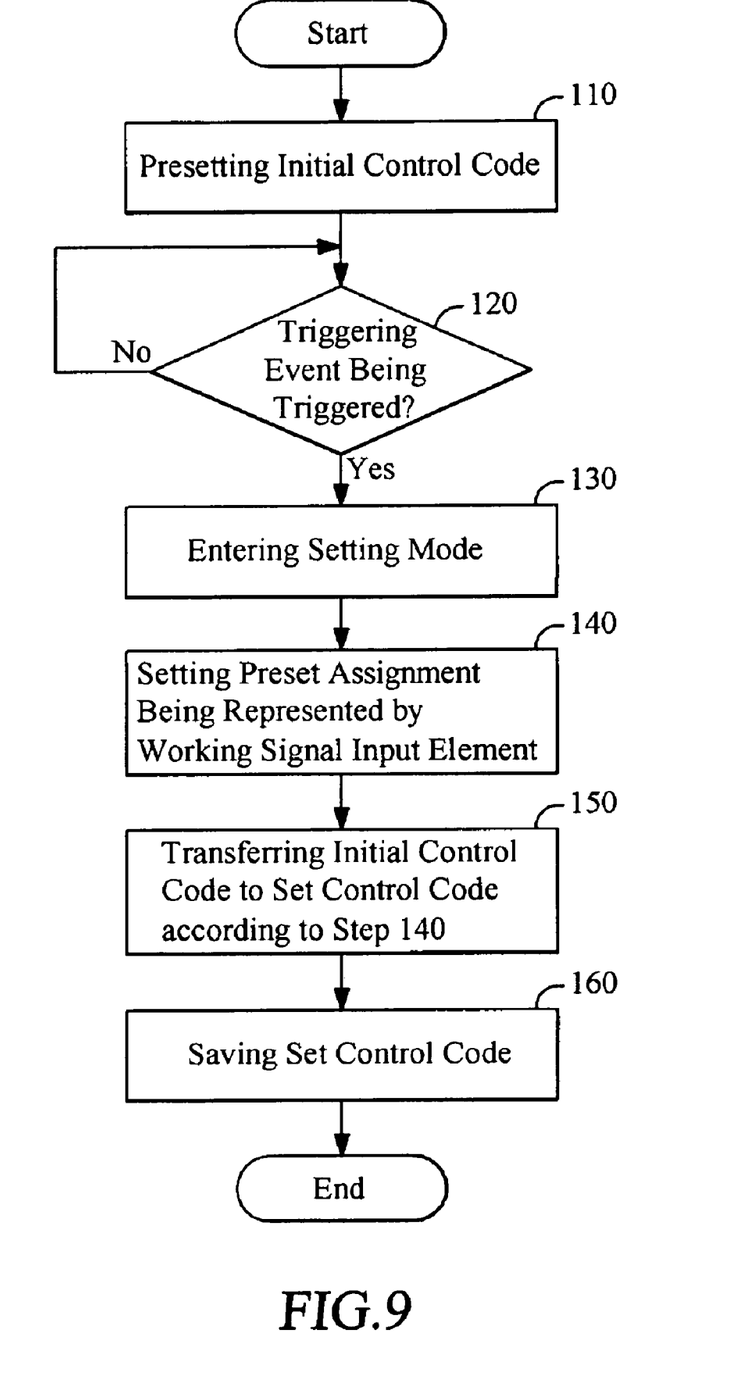
FIG. 9 is a simplified flowchart for setting the operation interface.

Except for the technology as disclosed in above description, the present invention further provides a method for setting the preset assignments that the working signal input elements (such as the operation icons 113a1, the simulate keyboard 113a2 or the simulate mouse 113a3 displayed on the operation display 113a provided in a touch screen, or the working signal input elements 112a) of the operation interface 11a represents. Please refer to FIG. 3 and FIG. 9, wherein FIG. 9 is a simplified flowchart for setting the operation interface.

As shown in the figures, the interface-function setting program 611 is preset with an initial control code (step 110). When switching to the third operation mode as mentioned above, it is able to press the trigger element 111a to generate the triggering signal. The triggering signal can be transmitted to the micro control unit 61 to make a triggering event be triggered (step 120). When the triggering event is triggered, the interface-function setting program 611 enters a setting mode (step 120). In this moment, the interface-function setting program 611 calls the initial control code preset therein, and displays the initial control code on the operation display 113a.

The initial control code is applied to initially define each of the preset assignments that each of the working signal input elements 112a represents. Next, the user can set or reset, according to his operation habits or the actual-use requirements of the electronic computing device 5a, each of the preset assignments that each of the working signal input elements 112a represents (step 140). Then, the interface-function setting program can transfer the initial control code to a set control code in accordance with step 140 (step 150), and display the set control code on the operation display 113a for the user to certify. Finally, the user can operate the operation interface 11a to save the set control code to the micro control unit 61 (step 160).

In practice, the set control code certified by the user usually can be saved in a memory of the micro control unit 15a. After finishing above setting steps, the set control code is applied to re-define each of the preset assignments that each of the working signal input elements represents.

People skilled in ordinary arts can easily realize that in the present invention, the operation interface 11a of the car-use audio device 1a of the car-use control system 100 is applied to control one electronic computing device only. However, in actual applications, it is undoubtedly that the car-use audio device 1a also can be applied to control more electronic computing device. Furthermore, the present invention also can provide a method for the user to reset each of the preset assignments that each of the working signal input elements 112a represents in accordance with to his operation habits or the actual-use requirements of the electronic computing device 5a. Therefore, it is obvious that the present invention really can effectively provide more convenience in operation.

Additionally, people skilled in ordinary arts can further realize that in actual applications, if the compatibility, both in spatial and electrical, between car-use extended device 6 and the car-use audio device 1 as provided in prior arts, it is just necessary to directly connect the car-use extended device 6 to the car-use audio device 1 to conveniently carry out the technology as disclosed in the present invention without doing any refit.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A car-use extended device being applied to electrically communicate to a car-use audio to from a car-use control system, so as to use the car-use control system to simulate a user-to-machine operation interface for controlling an electronic computing device installed with an operation system to execute at least one preset assignment; the car-use audio comprising an operation interface, which comprises a trigger element and at least one working signal input element; the triggering element generating a triggering signal after being triggered; and the car-use extended device comprising:
a micro control unit being electrically communicated to the operation interface for receiving the triggering signal, and comprising:
an interface-function setting program for defining said at least one preset assignment that the working signal input element represents after the micro control unit receiving the triggering signal, so as to simulate the user-to-machine operation interface;
wherein when the trigger element and the working signal input element are triggered in turn, the micro control unit outputs a working signal to the electronic computing device in accordance with the preset assignment that the working signal input element represents, so as to control the electronic computing device to execute the preset assignment.

2. The car-use extended device as claimed in claim 1, wherein the micro control unit is electrically connected to a speed monitoring element, so as to transfer a car motion speed to a speed data, and transmit the speed data to the electronic computing device.

3. The car-use extended device as claimed in claim 1, further comprising a power supplying unit electrically communicated to the electronic computing device, the micro control unit and a power source, wherein when the car-use audio device is turned on, a power supplying signal is transmitted to the power supplying unit via the micro control unit, so as to make the power supplying unit supply an specified electricity to the electronic computing device.

4. The car-use extended device as claimed in claim 1, wherein the working signal input element is defined as a power on/off button for controlling whether supplying the specified electricity to the electronic computing device.

5. The car-use extended device as claimed in claim 1, wherein the working signal input element is defined as a reset for resetting the electronic computing device.

6. The car-use extended device as claimed in claim 1, further comprising a multimedia reading device for transmitting a multimedia data to the electronic computing device after reading the multimedia data.

7. The car-use extended device as claimed in claim 1, further comprising a sound signal processing unit electrically communicated to the micro control unit.

8. The car-use extended device as claimed in claim 7, wherein the car-use audio device further comprises a multimedia reading unit electrically communicated to the sound signal processing unit, so as to transmit a multimedia data to the sound signal processing unit after reading the multimedia data.

9. The car-use extended device as claimed in claim 7, wherein the sound signal processing unit is electrically communicated to a sound playing unit, which plays a multimedia data provided by the electronic computing device and processed by the sound signal processing unit.

10. The car-use extended device as claimed in claim 1, further comprising an image signal processing unit electrically communicated to the micro control unit.

11. The car-use extended device as claimed in claim 10, wherein the car-use audio device further comprises a multimedia reading unit electrically communicated to the image signal processing unit, so as to transmit a multimedia data to the image signal processing unit after reading the multimedia data.

12. The car-use extended device as claimed in claim 10, wherein the image signal processing unit is electrically communicated to a main display, which displays a multimedia data provided by the electronic computing device and processed by the image signal processing unit.

13. The car-use extended device as claimed in claim 10, wherein the operation interface further comprises an operation display electrically communicated to the image signal processing unit.

14. The car-use extended device as claimed in claim 10, wherein the image signal processing unit comprising an on screen display (OSD) processing circuit.

15. The car-use extended device as claimed in claim 14, wherein the working signal input element is at least one operation icon, simulate keyboard or simulate mouse, which is input by the OSD processing circuit and displayed on the touch screen.

16. The car-use extended device as claimed in claim 1, further comprising a first serial bus circuit electrically communicated to the micro control unit and the car-use audio device.

17. The car-use extended device as claimed in claim 16, further comprising a sound signal processing unit and an image signal processing unit both electrically communicated the first serial bus circuit.

18. The car-use extended device as claimed in claim 1, further comprising a second serial bus circuit respectively coupled with the micro control unit and the electronic computing device.

19. The car-use extended device as claimed in claim 18, wherein the second serial bus is a wireless universal serial bus (USB) circuit or a wireless universal serial bus (Wireless USB) circuit.

20. The car-use extended device as claimed in claim 18, further comprising a sound signal processing unit and an image signal processing unit both electrically communicated to the second serial bus circuit.

21. The car-use extended device as claimed in claim 1, wherein the electronic computing device is a personal computer, a notebook, an embedded computer, a mobile phone, or a video game machine.

22. A method being applied to set at least one preset assignment, that the working signal input element represents in claim 1, and comprising the steps of:

(a) making a triggering event be triggered to enter a setting mode;

(b) setting the preset assignment that the working signal input element represents, to accordingly transfer to a set control code; and (c) saving the set control code.

23. The method as claimed in claim 22, before the step (a), further comprising a step (a0) of presetting an initial control code.

24. The method as claimed in claim 23, wherein the step (b) further comprises a step (b1) of displaying the initial control code.

25. The method as claimed in claim 23, wherein the step (b) further comprises a step (b2) of transferring the initial control code to the set control code.

* * * * *